Jan. 16, 1940.  F. F. NEWHOUSE  2,187,691
GARMENT HANGER
Original Filed June 20, 1934
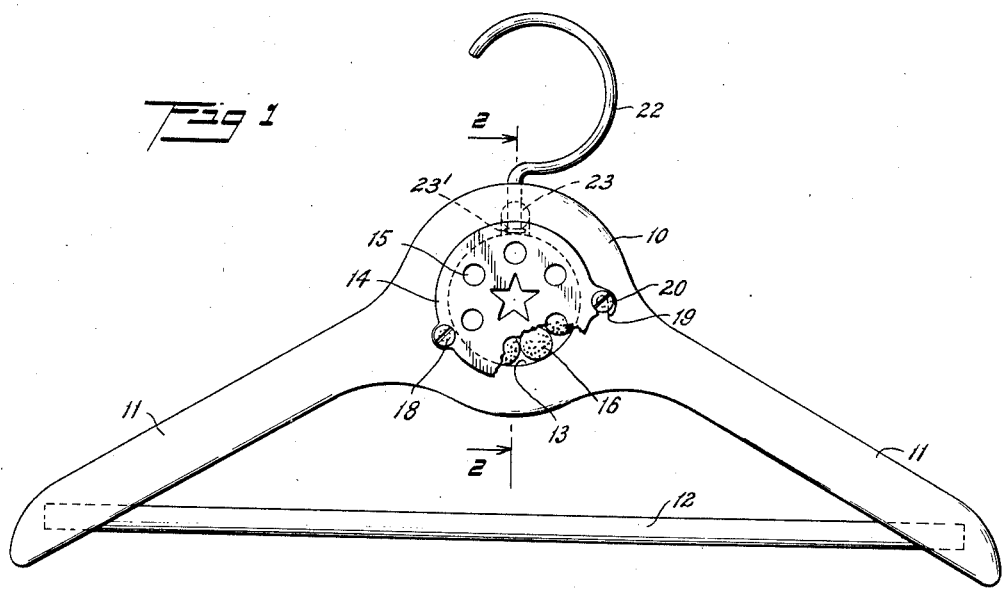
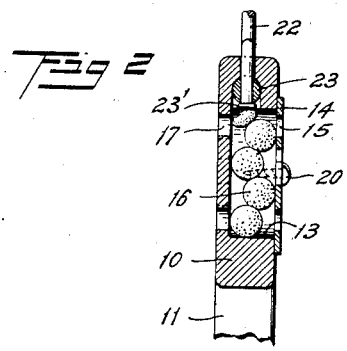
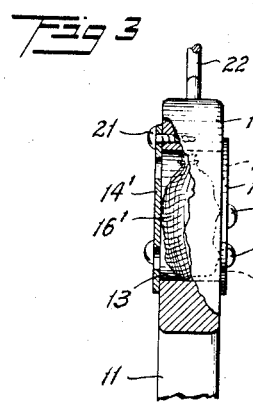
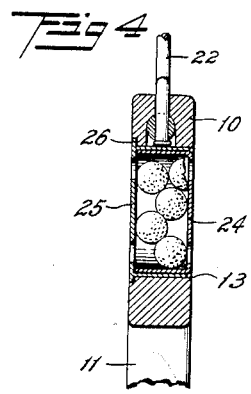
INVENTOR.
Frank F. Newhouse
BY F. Bascom Smith
ATTORNEY Patented Jan. 16, 1940

2,187,691

UNITED STATES PATENT OFFICE 2,187,691

GARMENT HANGER

Frank F. Newhouse, Glendale, Calif.

Substituted for abandoned application Serial No. 731,542, June 20, 1934. This application May 29, 1939, Serial No. 276,387

3 Claims. (Cl. 223—86)

This invention relates to garment hangers and more particularly to a combination hanger and insect repellant means.

This application is a substitute for application Serial Number 731,542, filed June 20, 1934.

It has been heretofore suggested to provide garment hangers so constructed as to permit of the housing of moth balls and other insect repellants within the hangers, but all of the prior devices have proved impracticable and commercially unsuccessful. The devices of the prior art do not overcome the disadvantages in the usual method of using insect repellants and are, in addition, expensive and difficult to manufacture.

One of the objects of the present invention is to provide a novel combination of garment hanger and insect repellant device.

Another object of the invention is to provide novel means for housing an insect repellant so that the latter will be effective and yet not be in immediate contact with the clothing.

Another object is to provide a combination garment hanger and insect repellant device which is of light weight, simple in construction, and effective, and which may be readily and inexpensively manufactured.

The above and further objects and novel features of this invention will more fully appear in the following detailed description taken in connection with the accompanying drawing. It is to be expressly understood, however, that the drawing is for the purpose of illustration only and is not designed as a definition of the limits of the invention, reference being primarily had for this purpose to the appended claims.

In the drawing, wherein like reference characters refer to like parts throughout the several views, Fig. 1 is a side elevation with parts broken away of a device embodying one form of the present invention;

Fig. 2 is a cross-sectional view taken on line 2—2 of Fig. 1; and,

Figs. 3 and 4 are views similar to Fig. 2 illustrating other embodiments of the invention.

One embodiment of the present invention has been illustrated by way of example in the form of a coathanger comprising a main body 10 having a pair of downwardly extending arms 11 simulating the shape of the shoulders of a human being. The central portion of main body 10 of the hanger is somewhat enlarged for a purpose to be hereinafter pointed out. The body 10 may be made of a single piece of material, preferably wood or composition, or the arms 11 may be formed of separate pieces joined together by any suitable means known to those skilled in the art.

If desired, a crossbar 12 may be provided extending across the layer ends of the arms 11 for the purpose of supporting trousers, scarfs, etc. As shown, the ends of said crossbar extend into recesses adjacent the outer ends of arms 11.

For the purpose of protecting clothing from insects such as moths, it has been the common practice to place moth balls or other suitable insect repellant in the pockets or otherwise in immediate contact with the clothing. Such a method has proved undesirable, since the clothing, because of the close contact, becomes saturated with the repellant as the same deteriorates, rendering such clothing unfit to be worn until thoroughly aired and cleaned.

In an attempt to overcome the above difficulties, it has been heretofore proposed to place a repellant in a garment hanger, thereby eliminating the necessity for handling the repellant each time the clothing is put away or taken out for use, and yet place it in sufficiently close relation to the clothing to be effective without saturating the latter and rendering it difficult to free the clothing from the undesirable odor. The hangers heretofore provided have been so constructed, however, as to bring the repellant in too close contact with the clothing and in many instances the repellant, as it deteriorates and powders, is permitted to fall down through the clothing, thus wholly failing to overcome the objections to the usual method of use.

The present invention provides means for fully meeting the above objections, and in the form shown in Figs. 1 and 2 such means comprise a recess 13 in the enlarged center portion of body 10. A cover 14, having a plurality of perforations 15 therein, is secured to the side of body 10 to cover said recess and to thereby form a chamber for the reception of an insect repellant such as moth balls 16. The inner end of recess 13 may, if desired, be opened to atmosphere by means of a plurality of openings 17 bored or punched in body 10. Cover 14 is preferably secured for pivotal movement on a screw 18 and is provided with a hook portion 19 adapted to engage a pin 20, thereby permitting of quick and easy replacement of the repellant when necessary.

If desired, recess 13 may extend through the entire thickness of body 10 (Fig. 3), an additional cover 14' secured to the back of said body by means of screws 21 being then provided to complete the chamber 13. In the latter embodiment, either or both of the covers 14, 14' may be perforated. Also, cover 14' may be countersunk into body 10 in order to be flush therewith. A bag 16' filled with a powdered odiferous substance such as is in common use for imparting a pleasing odor to clothing is shown in chamber 13. An insect repellant might also be used in powdered form in this manner.

The repellant 16 is thus kept in sufficiently close relation to the clothing supported by the hanger to be effective without being in direct contact therewith. Also, the dust formed during the use of the repellant is not permitted to fall down through the clothing, but rather settles in the bottom of container 13, 14. The odor from the repellant 16 is freely emitted through the perforations 15, 17, if openings 17 are used, effecting the desired results without unduly odorizing the clothing, thus making only a short airing necessary when it is desired to use the same.

For supporting the hanger, a hook 22 is provided. The lower straight portion of said hook, as shown, extends through a vertical bore in the body 10 and a ball 23 somewhat larger than said bore is positioned in a recess 23'. The extreme lower end of hook 22 is peened to retain ball 23 and thus permit rotation of said hook relative to the hanger.

A third embodiment of the invention is illustrated in Fig. 4 in which form a small telescopic container 24, 25, having one or both ends perforated, is adapted to have a close fit in recess or opening 13. A flange 26 may be provided on one portion of said container to insure both ends of the same being flush with body 10. Containers 24, 25 may be filled with suitable insect repellant at the factory and used for ready replacement whenever necessary.

There is thus provided a novel and useful combination garment hanger and insect repellant device which is extremely simple in construction, readily manufactured and inexpensive. It insures against the destruction of clothing by insects without rendering such clothing unfit for wear at any time, and without the constant handling of the repellant material which is not only undesirable but is conducive to waste. Inadvertence is also guarded against, the insect repellant being present at all times irrespective of the thoughtlessness of the person caring for the clothing.

Although only three embodiments of the invention have been illustrated and described, it is to be expressly understood that the invention is not limited thereto, but that various changes may be made in the design and arrangements of parts illustrated without departing from the spirit of the invention. It will be understood that various disinfectants may be employed instead of moth balls, and, in certain instances, it may be desired to employ perfume or deodorant rather than an insect repellant. Reference will be had to the appended claims for a definition of the limits of the invention.

What is claimed is:

1. In combination, a garment supporting device having a pair of downwardly projecting, diverging arms, the center portion of said device being enlarged and having an opening therein, and a cover for each end of said opening secured to said device, at least one of said covers being pivotally secured thereto, said opening and covers forming a chamber for an odiferous substance, and at least one of said covers being perforated to emit odors from said substance.

2. In combination, a garment supporting device having an angularly shaped body member, the center portion of said member having a recess therein for receiving an odiferous substance, hook means secured to said member for supporting the same, a pin on said body member, and a pivoted cover for said recess having a plurality of openings therein to retain said substance in the recess, said pivoted cover having a hook portion adapted to cooperate with said pin when the cover is in position to cover said recess.

3. In combination, a garment supporting device having a pair of downwardly projecting, diverging arms, the center portion of said device being enlarged and having an opening therein, and a cover for each end of said opening secured to said device, said opening and covers forming a chamber for an odiferous substance, at least one of said covers being pivotally mounted on said device and perforated to emit odors from said substance, said pivoted cover having a hook portion adapted to cooperate with a pin on said device when the cover is in position to cover said opening.

FRANK F. NEWHOUSE.